July 10, 1945.                J. O. DIBERT                2,380,297
                              EYEGLASS HOLDER
                            Filed July 6, 1944

Inventor
J. O. Dibert.

Patented July 10, 1945

2,380,297

UNITED STATES PATENT OFFICE 2,380,297

EYEGLASS HOLDER

James O. Dibert, Altoona, Pa.

Application July 6, 1944, Serial No. 543,688

1 Claim. (Cl. 248—300)

This invention relates to an eyeglass holder and it is primarily an object of the invention to provide a device of this kind constructed in a manner whereby its visual aspect will readily suggest its purpose and which may be readily and conveniently supported in a location of conspicuity to minimize the probability of a person forgetting the eyeglasses.

It is also an object of the invention to provide a holder for eyeglasses which is particularly designed and adapted for use in wash rooms, barber shops, beauty salons and such other places where it is often required that a person remove eyeglasses and wherein the device is of such a character to conveniently and safely hold the eyeglasses.

The invention consists in the details of construction and in the combination and arrangement of the several parts of my improved eyeglass holder whereby certain important advantages are attained, as will be hereinafter more fully set forth.

In order that my invention may be better understood, I will now proceed to describe the same with reference to the accompanying drawing, wherein.

In the embodiment of the invention as illustrated in the accompanying drawing, I denotes a plate of preferred dimensions and which is herein disclosed as rectangular in form. This plate may be of any material desired but can be produced to the best advantage from metal or plastic. The marginal portions of the plate I are formed to provide the outwardly disposed beads 2 to assure the plate I having maximum strength and rigidity.

Extending forwardly from the lower portion of the plate I and at points spaced lengthwise thereof are the pocket members 3 each of which has its top open and with its top margin within substantially a common plane and in a plane substantially parallel to the longitudinal axis of the plate I.

It is also to be noted that these pocket members 3 are positioned below the transverse center of the plate I and that in front elevation each of these pockets 3 is in close simultation of the lower half of the lens of an eyeglass.

The configuration of each of these pockets 3 is such as to snugly receive therein the lower portion of the lens of an eyeglass so that when both of the lenses of the eyeglasses are within the two pockets 3, the same will be effectively maintained in a safe position.

The pockets 3 are positioned closely adjacent to each other but with a pronounced intervening space 4.

Figure 1:
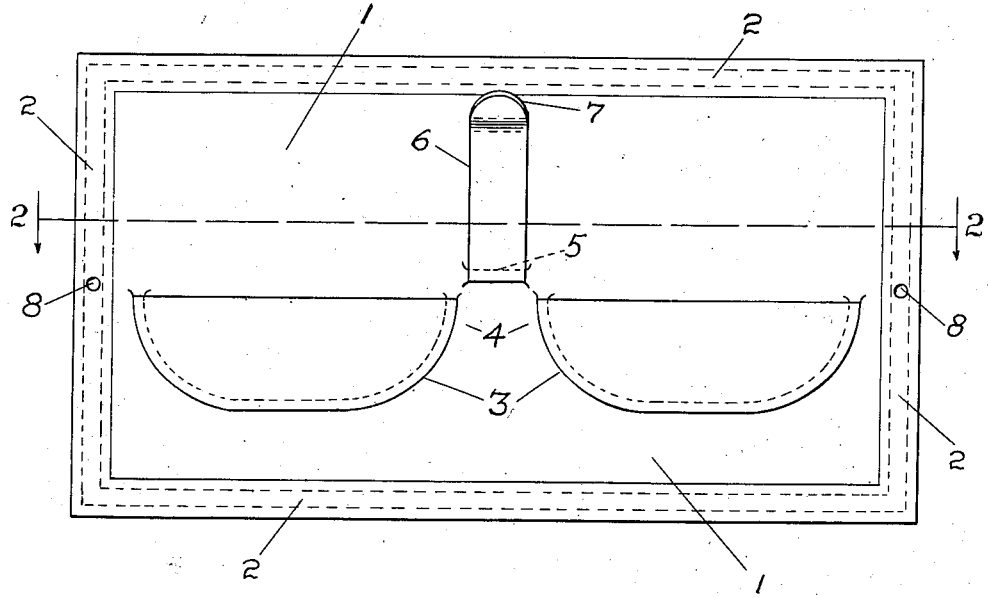
Figure 1 is a view in front elevation of an eyeglass holder constructed in accordance with an embodiment of my invention.
Figure 2:
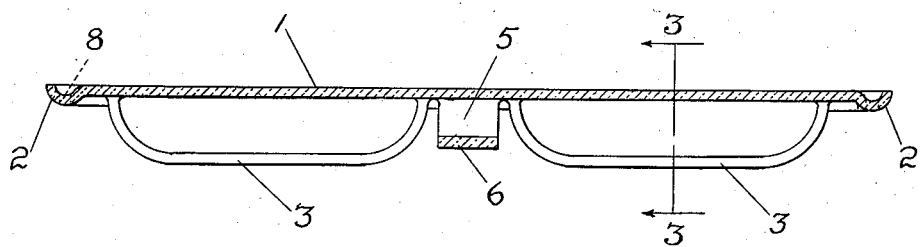
Figure 2 is a sectional view taken substantially on the line 2—2 of Figure 1, looking in the direction of the arrows.
Figure 3:
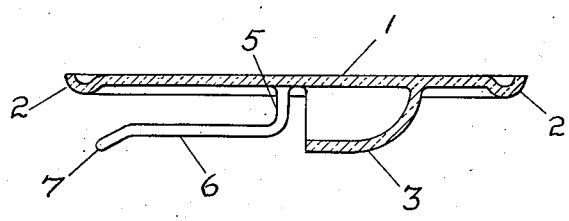
Figure 3 is a vertical sectional view taken substantially on the line 3—3 of Figure 2, looking in the direction of the arrows.

Projecting forwardly from the plate I above this intervening space 4 but in relatively close proximity thereto is a short arm 5 which, as is illustrated in Figures 2 and 3 of the drawing, terminates inwardly of the outermost portions of the pocket members 3. The arm 5 is continued by a relatively long upstanding tongue 6 having its upper extremity disposed outwardly, as at 7, on a predetermined incline.

When the eyeglasses are applied to the holder, the lenses of the glasses are inserted from above within the pockets 3 and the bridge of the glasses will be received between the plate I and the upstanding tongue 6, whereby the eyeglasses are held in a manner to assure the same from dropping.

In the present embodiment of the invention, the plate I in its opposite end portions and through the end beads 2 is provided with the openings 8, whereby suitable anchoring elements, such as screws or the like, may be inserted for mounting the holder in desired position upon a suitable support and in a position whereby the holder will be best located for visual aspect so that the person who may place the eyeglasses upon the holder will be continuously reminded not to forget the eyeglasses.

The holder is particularly advantageous for use in wash rooms, both public and private, barber and beauty shops, and other places where a person may be required to remove eyeglasses.

It is to be stated that any means may be employed that may best suit the purpose for mounting the holder in working position as, for example, the device may be cemented or glued to a wall, mirror or other surface, it only being required that it be effectively maintained in a position of sufficient conspicuity.

It is to be further pointed out that the visual aspect of the holder and particularly as results from the relativity of the pockets 3 and the upstanding tongue 6 give a simulation of eyeglasses, whereby a person may be further reminded not to leave without his or her glasses.

From the foregoing description it is thought to be obvious that an eyeglass holder constructed in accordance with my invention is particularly well adapted for use by reason of the convenience and facility with which it may be assembled and operated.

I claim:

A holder for eyeglasses comprising a plate, a pair of pockets attached to a face of the plate and arranged in closely spaced side by side relation, said pockets each substantially conforming in outline to the lower half of an eyeglass lens to receive the lower portions of such lenses of eyeglasses, and a forwardly and upwardly extending flat tongue secured to the said face of the plate and slightly spaced therefrom, said arm being located between the pockets and entirely thereabove.

JAMES O. DIBERT.